United States Patent
Orizaris et al.

(10) Patent No.: US 6,299,250 B1
(45) Date of Patent: Oct. 9, 2001

(54) CONTOUR ADJUSTABLE VEHICLE SEAT

(75) Inventors: Vasilios Orizaris, Renningen; Jürgen Schrader, Weil im Schönbuch; Wolfram Schröder, Wildberg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/625,554

(22) Filed: Jul. 25, 2000

(30) Foreign Application Priority Data

Jul. 27, 1999 (DE) ............................................. 199 34 472

(51) Int. Cl.⁷ ....................................................... A47C 4/54
(52) U.S. Cl. .................................. 297/284.6; 297/DIG. 3
(58) Field of Search .............................. 297/284.4, 284.1, 297/284.6, 452.41, DIG. 3

(56) References Cited

U.S. PATENT DOCUMENTS 4,655,505 * 4/1987 Kashiwamura et al. .
5,005,904 * 4/1991 Clemens et al. .
5,152,579 * 10/1992 Bishai .
5,678,891 * 10/1997 O'Neill et al. .
5,893,609 * 4/1999 Schmidt .

* cited by examiner

Primary Examiner—Milton Nelson, Jr.
(74) Attorney, Agent, or Firm—Crowell & Moring LLP

(57) ABSTRACT

A vehicle seat with a contour adjustment mechanism and control for the lordosis region of the seatback portion including at least two air cushions arranged one above another, the control including an operating unit and switching assembly for changing air pressure in the two air cushions. Specifically, two sets of operative switches are provided, one set to signal the operating unit to produce a change of the air pressure ratio between the two air cushions and the other set to simultaneously change the air pressure in the two cushions without changing the current pressure ratio.

12 Claims, 1 Drawing Sheet

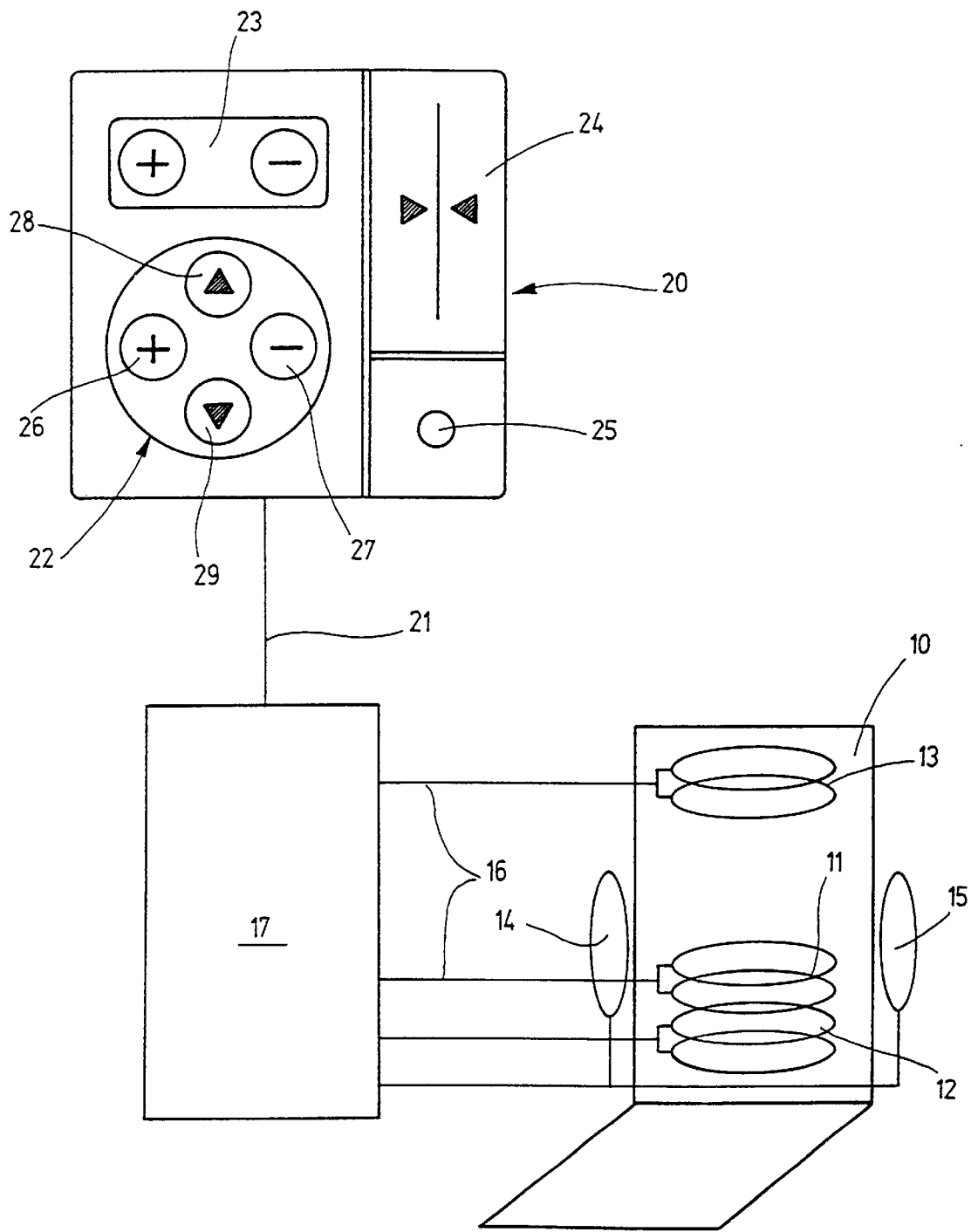

CONTOUR ADJUSTABLE VEHICLE SEAT

BACKGROUND OF THE INVENTION

1. Field of the Invention

This invention relates to a contour-adjustable seat, in particular a vehicle seat.

2. Description of Related Art

A known vehicle seat of this general type is disclosed in German DE 195 34 660 C1 in which three air cushions in the seat's lordosis region of the backrest are arranged one above another. The three air cushions are activated separately by an operating control device in order to provide a desired seat contour in the backrest region. The operating control device has: a first button for increasing air pressure; a second button for decreasing air pressure; and a switch for selecting a region or one of the air cushions to be adjusted. Also, a pair of air cushions in the shoulder region of the backrest can be selected in addition to one of the three air cushions in the backrest. In order to produce a desired seat contour in the lordosis region, the pressure in the air cushions is changed cyclically, in a time-shifting process, in accordance with a specified pressure characteristic running periodically between a maximum pressure and a minimum pressure. In other words, pressure activation of the next adjacent air cushion begins at or before the minimum pressure is reached in the adjacent preceding air cushion.

Another known vehicle seat of this general type is disclosed in German DE 43 31 663 C1 in which the operating control device utilizes a pressure-selecting rocker switch and a continuous-flow type switch. The continuous-flow type switch is used to select that seat region in which a contour adjustment is desired. By pressing the rocker switch into one of two directions, the air pressure in the selected cushion is increased or decreased. Accordingly, the seat cushion is altered so the seatback contour and the seat support is changed.

SUMMARY OF THE INVENTION

An object of this invention is to provide a simple contour-adjustment in the lordosis region of the backrest by a logical operation of the operating control device.

An advantageous feature is that the user of the control device has an option of using one pair of buttons to preselect a desired distribution of air pressure into any number of the separate air cushions within the lordosis region of the backrest to set a desired lordosis contour thereof. The user may then operate a second pair of buttons to change the intensity of the backrest's degree of curvature. During this distribution of pressure to the air cushions, the filling pressure directed to the air cushions is not provided at a maximum filling pressure, but is only provided to an extent sufficient to make the user or person sitting in the seat aware of a point of pressure exerted at a particular desired position. This individual point of pressure or "detected" contour can then be adjusted or fine tuned by pressing the other pair of instruction buttons which either increases or decreases cushion pressure. In this manner, the exact degree of curvature of the contour profile is increased or reduced but the previously set contour profile is not changed. According to the invention, a very simple and yet orthopedically effective change in contour distribution can be achieved without the user having to perform a multiplicity of adjustments of the operating control device.

BRIEF DESCRIPTION OF THE DRAWINGS

The subject invention is described in more detail below with reference to an exemplary embodiment which is illustrated in the drawing. The drawing shows a schematic block diagram of the circuit of a contour-adjustable vehicle seat.

DESCRIPTION OF A PREFERRED EMBODIMENT

A vehicle seat is shown in the drawing in block diagram form including a backrest portion 10 supporting a plurality of air cushions. In the particular example, two air cushions 11 and 12 are arranged one above the other and in the lordosis region of the backrest. Another air cushion 13 is located in a shoulder region and two additional air cushions 14, 15 are located in side regions of the backrest 10. The air cushions 11, 12 and 13 each have two separate air chambers in order to obtain a flat cushion contour as homogenous as possible. The cushions 11, 12, and 13 extend one above the other over the height of the backrest 10. A set of four pneumatic lines 16 are used to charge the cushions 11–15 with compressed air under control of a device 17. The control device 17 is associated with a source of compressed air in a container for example (container not illustrated). The two side air cushions 14, 15 are filled and emptied via a common pneumatic line 16, and also the air chambers in the air cushions 11–13 are activated in common via a respective pneumatic line 16. Although not illustrated in the drawings, pressure sensors associated with each of the cushions 11–15 are linked to the control device 17 to input necessary information concerning the pressure in each individual air cushions 11–15.

The user or person in the seat operates a control device 20 to input instructions as to a desired contour for the seat assembly. Resultantly the device 20 outputs a signal to the control device 17 through an electric harness or lines 21. The device 20 includes a "cross-shaped" rocker-type switch mechanism 22, a pushbutton rocker-type switch 23, and a rocker-type switch 24. The switch 23 is a four-way switching device. A light-emitting diode 25 operates to display the operative mode or state of the device 20. Air cushions 11, 12 located in the lordosis region are activated by means of the cross rocker button 22. Air cushion 13 in the shoulder region is activated by means of the rocker-type switch 23 and the two side air cushions 14, 15 are activated by means of rocker-type switch 24. When the "+" symbol on the rocker-type switch 23 is pushed, the air pressure in air cushion 13 is increased and if the "−" symbol is pushed the air pressure in the air cushion 13 is reduced. The air pressure in the side air cushions 14, 15 is changed in a similar manner utilizing rocker switch 24.

The cross-shaped rocker switch 22 has four instruction buttons 26–29. If the "+" symbol is pushed, the air pressure in the two air cushions 11, 12 is increased but with the filling procedure broken-off when a maximum filling pressure is reached in either one of these two air cushions 11, 12. If the "−" symbol is pushed, the air pressure in the two air cushions 11, 12 is reduced, but with the air discharging procedure being broken-off as soon as the filling pressure in either one of the two air cushions 11, 12 reaches a specified minimum value. In the exemplary embodiment, the maximum air pressure in the upper air cushion 11 is set at 100 hPa, and in the lower air cushion 12 is set at 200 hPa, while the minimum filling pressure in each air cushion 11, 12 is 15 hPa.

If the two instruction buttons 28, 29 having an arrow symbol are pressed, the ratio of the filling pressures in the two air cushions 11, 12 is changed with respect to each other. For example, pressing button 28 (upwardly directed arrow symbol) produces an increase in air pressure. Pressing button 29 (downwardly directed arrow symbol) produces a decrease in the pressure ratio between cushions 11, 12. In this arrangement, the control device 17 changes the pressure ratio for as long as the particular button 28 or button 29 is pushed and a preselected pressure in the cushions 11, 12 has not yet been reached. For reasons related to the ergonomics of sitting, when the pressure ratio between the air cushions 11, 12 is set by the control device 17, it is ensured that the ratio of the filling pressure in the upper air cushion 11 to the filling pressure in the lower air cushion 12 is never less than 0.25.

When the arrowed button 28 of the four-way rocker-type switch 22 is pressed by the user, the backrest contour in the lordosis region is changed by increasing the pressure ratio of the upper air cushion 11 with respect to the lower air cushion 12. This produces an upwards movement of the pressure point felt by the user. During this procedure, first air pressure in the lower cushion is reduced and then air pressure in the upper cushion 11 is increased to a pre-specified delivery pressure value (140 hPa in this exemplary embodiment). However, filling of the upper cushion is curtailed at 70% of the maximum filling pressure (150 hPa in the exemplary embodiment). Thus, filling of the upper cushion is discontinued at 70% of the maximum filling pressure is reached. Likewise, the reduction in air pressure in the lower air cushion 12 is stopped as soon as the minimum filling pressure (in the exemplary embodiment 15 hPa) is reached.

When the arrowed button 29 is pressed, the backrest's contour in its lordosis region is changed by first reducing the air pressure of the upper air cushion 11 with respect to the lower air cushion 12. This moves downwards the pressure point felt by the user. Specifically, the air pressure in the upper cushion 11 is decreased while the air pressure in the lower air cushion 12 is increased. The extent of increasing pressure in the lower air cushion 12 is terminated when the pressure in the lower air cushion 12 has reached 80% of the maximum filling pressure (in the exemplary embodiment 200 hPa). Likewise, the decreasing of air pressure in the upper air cushion 11 halts when the air pressure reaches the specified minimum pressure value (in the exemplary embodiment 15 hPa). Because the air pressure achieved in the two cushions 11 and 12 of the lordosis region are not increased to the maximum end pressure, the user is aware of and can effectively select a desired position of a pressure point. Accordingly, the user can set a desired contour profile in the lordosis region.

Further fine tune setting of the contour and therefore of the degree of curvature in the lordosis region can now be accomplished by pressing the arrowed buttons 26, 27.

As long as the user is pressing the first button 26, the two air cushions 11, 12 are filled simultaneously. The filling is stopped as soon as the maximum permitted filling pressure has been reached in one of the two air cushions 11, 12 (in the exemplary embodiment 150 hPa for the upper air cushion 11 and 200 hPa for the lower air cushion 12). In contrast, if the user continuously presses the second button 27, the air pressure in the two air cushions 11, 12 is decreased simultaneously, with the procedure being broken off when the specified minimum filling pressure is reached in one of the two air cushions 11, 12 (15 hPa for both air cushions 11, 12).

While a preferred embodiment has been shown and described, other embodiments will now become apparent to those skilled in the art. Accordingly, this invention is not to be limited to that which is shown and described but by the following claims.

What is claimed is:

1. A vehicle seat with a backrest portion (10) having at least two air cushions (11, 12) for contour adjustment in the lordosis region of the backrest, the air cushions being arranged one above another, and a control to select a desired lordosis region contour, comprising: an electronic control (17) for regulating air pressure in the air cushions (11, 12); a manually operable switching device (20) linked to input the electronic control (17); said switching device (20) having a first button (26) to signal the electronic control (17) to increase air pressure in the air cushions (11, 12) and a second button (27) to signal the electronic control (17) to decrease air pressure in the air cushions (11, 12); said switching device (20) having third and fourth buttons (28, 29) inputting said electronic control (17) to change the ratio of the air pressures in the air cushions (11, 12) with respect to each other; wherein operation of one of the first button (26) and of the second button (27) produces a simultaneous change in the air pressures in the air cushions (11, 12) while maintaining the ratio of air pressures in the air cushions to remain constant.

2. The seat and contour control as set forth in claim 1, in which pressing the first button (26) fills both air cushions (11, 12) simultaneously to increase their internal air pressure, and pressing the second button (27) empties both air cushions (11, 12) simultaneously to decrease their internal air pressure.

3. The seat and contour control as set forth in claim 2, in which the control (17) terminates filling of the air cushions (11, 12) when a desired maximum filling pressure is reached in one of the air cushions (11, 12).

4. The seat and contour control as set forth in claim 2, in which the control (17) terminates emptying the air cushions (11, 12) when a desired minimum filling pressure is reached in one of the air cushions (11, 12).

5. The seat and contour control as set forth in either of claims 3 and 4 in which the maximum filling pressure in the lower air cushion (11) is 200 hPa, and the maximum filling pressure in the upper air cushion (12) is 150 hPa, and the minimum filling pressure in either of the two air cushions (11, 12) is 15 hPa.

6. The seat and contour control as set forth in claim 1, in which operation of the third button (28) signals the control (17) to increase the air pressure ratio between the air cushions (11, 12), and operation of the fourth button (29) signals the control (17) to decrease the air pressure ratio between the air cushions (11, 12).

7. The seat and contour control as set forth in claim 6, in which the two air cushions include an upper cushion (11) and a lower cushion (12) and in response to operation of the button (28) the control (17) first decreases air pressure in the lower air cushion (12) and then increases air pressure in the upper air cushion (11).

8. The seat and contour control as set forth in claim 7 in which air pressure in the upper air cushion (11) is increased to a pressure level of 70% of a maximum fill pressure, and the lower air cushion (12) is decreased to a minimum fill pressure level.

9. The seat and contour control as set forth in either of claims 7 or 8 in which the electronic control (17) in response to pressing the fourth button (29) simultaneously decreases air pressure in the upper air cushion (11) and increases air pressure in the lower air cushion (12).

10. The seat and contour control as set forth in claim 9 in which the increase in air pressure in the lower air cushion (12) is stopped when the pressure level attains 80% of a desired maximum fill pressure, and the decrease in air pressure in the upper air cushion (11) is stopped when the pressure level attains a desired minimum fill pressure.

11. The seat and contour control as set forth in claim 6 in which the ratio between the air pressure in the upper air cushion (11) to the air pressure in the lower air cushion (12) is maintained at 0.25 or greater.

12. The seat and contour control as set forth in claim 1 in which the four buttons (26, 27, 28, and 29) are integrated into a four-way rocker type switch (22).

* * * * *